United States Patent [19]

Hirano et al.

[11] Patent Number: 5,538,198
[45] Date of Patent: Jul. 23, 1996

[54] HANDLE FOR FISHING REEL

[75] Inventors: Kazuo Hirano; Kyoichi Kaneko; Masaji Saito, all of Tokyo, Japan

[73] Assignee: Daiwa Seiko, Inc., Tokyo, Japan

[21] Appl. No.: 145,854

[22] Filed: Nov. 5, 1993

[30] Foreign Application Priority Data

| Nov. 5, 1992 | [JP] | Japan | 4-082764 U |
| Jul. 15, 1993 | [JP] | Japan | 5-197872 |
| Aug. 6, 1993 | [JP] | Japan | 5-213481 |

[51] Int. Cl.⁶ .......................... A01K 89/01; A01K 89/015
[52] U.S. Cl. .......................... 242/283; 74/545; D22/140
[58] Field of Search .................. 242/282, 283, 242/284; 74/543, 545; D22/140, 141, 142

[56] References Cited

U.S. PATENT DOCUMENTS

| D. 246,662 | 12/1977 | Okada | D22/141 |
| D. 247,442 | 3/1978 | Hiraishi et al. | D22/140 |
| D. 255,823 | 7/1980 | Deguchi et al. | D22/141 |
| 627,767 | 6/1899 | Wisner | 242/283 X |
| 2,055,358 | 9/1936 | Maynes | 242/283 X |
| 2,643,131 | 6/1953 | King | 242/283 X |
| 2,713,274 | 7/1955 | Lockwood | 242/283 X |
| 3,011,362 | 12/1961 | Cronholm | 242/284 X |

FOREIGN PATENT DOCUMENTS

| 56-68473 | 6/1981 | Japan . |
| 62-119722 | 7/1987 | Japan . |
| 1338098 | 11/1973 | United Kingdom | 74/543 |

OTHER PUBLICATIONS

Jauco Industries, Inc. "Tens–o–Matic Retriever Control", Field & Stream Dec. 1959.

*Primary Examiner*—Daniel P. Stodola
*Assistant Examiner*—William A. Rivera
*Attorney, Agent, or Firm*—Longacre & White

[57] ABSTRACT

A balancer is integrally and projectingly formed on a boss of a handle arm. The handle arm has a support shaft opposite from the balancer, a knob is rotatably supported on the support shaft. A portion of the handle arm around and in the vicinity of the boss is formed into a smooth surface, and an outer periphery of the balancer is also formed into a smooth surface. Thus, a fishline is prevented from tangling onto the balancer.

2 Claims, 8 Drawing Sheets

FIG. 1
FIG. 2
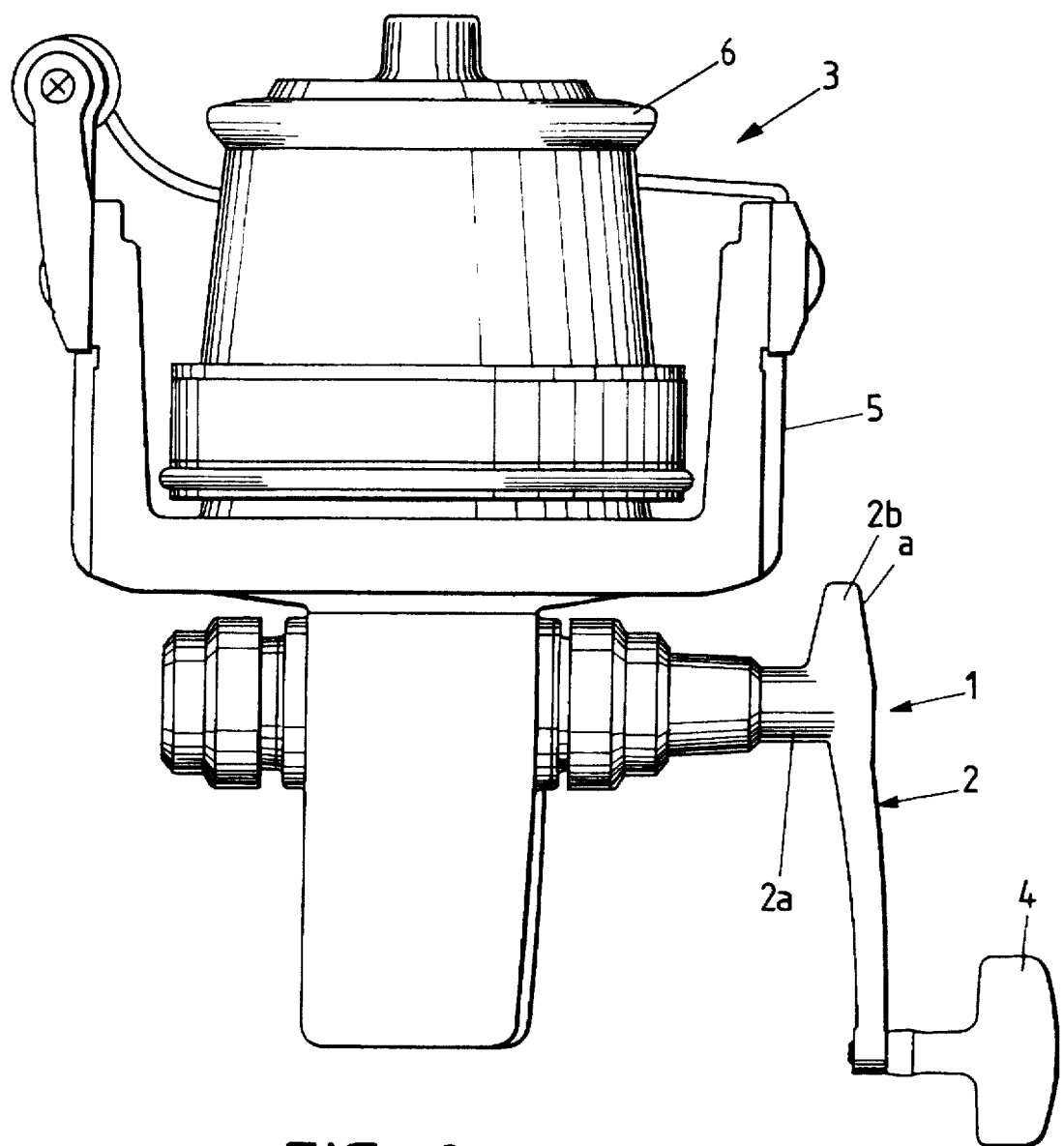
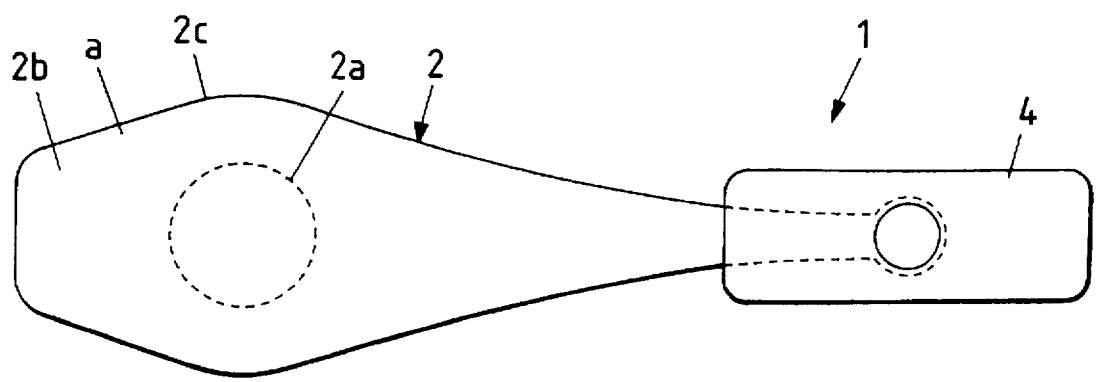

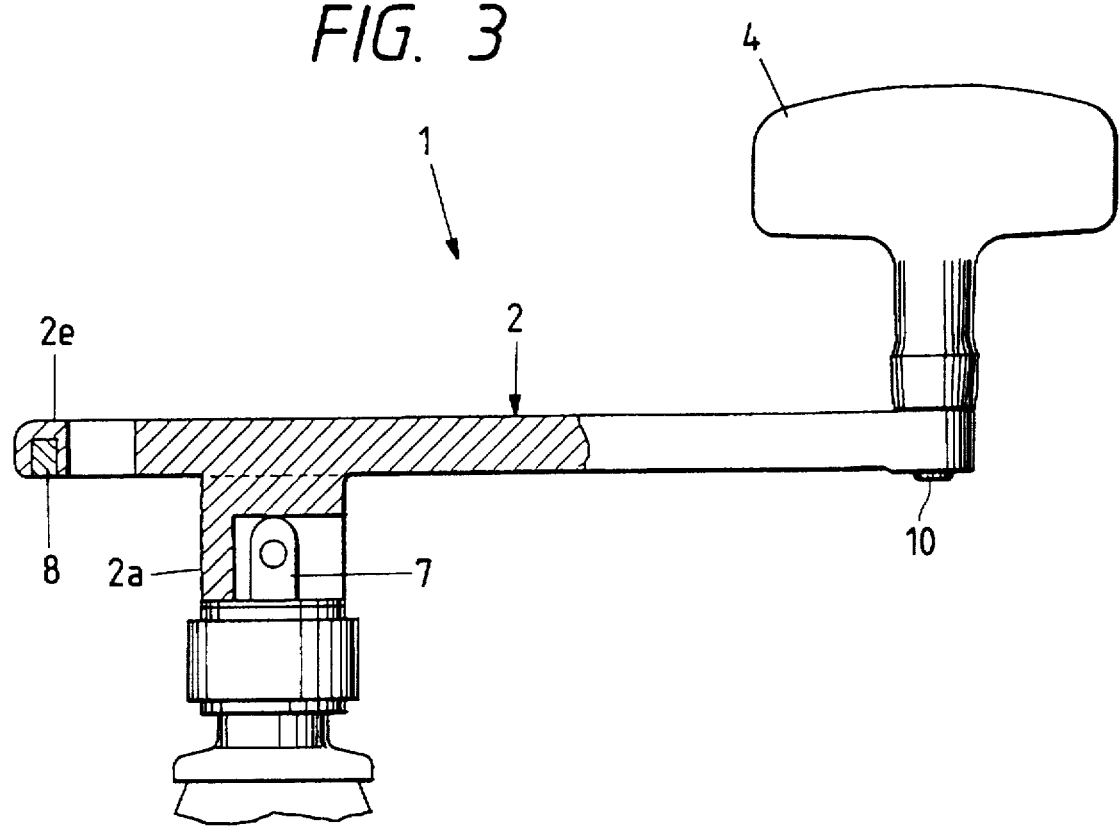
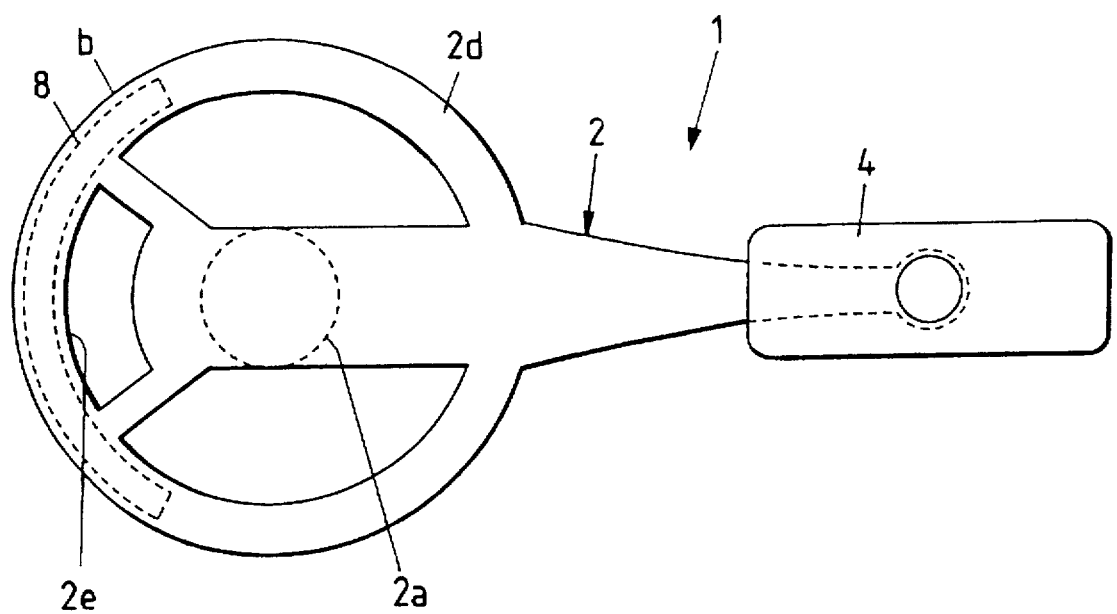

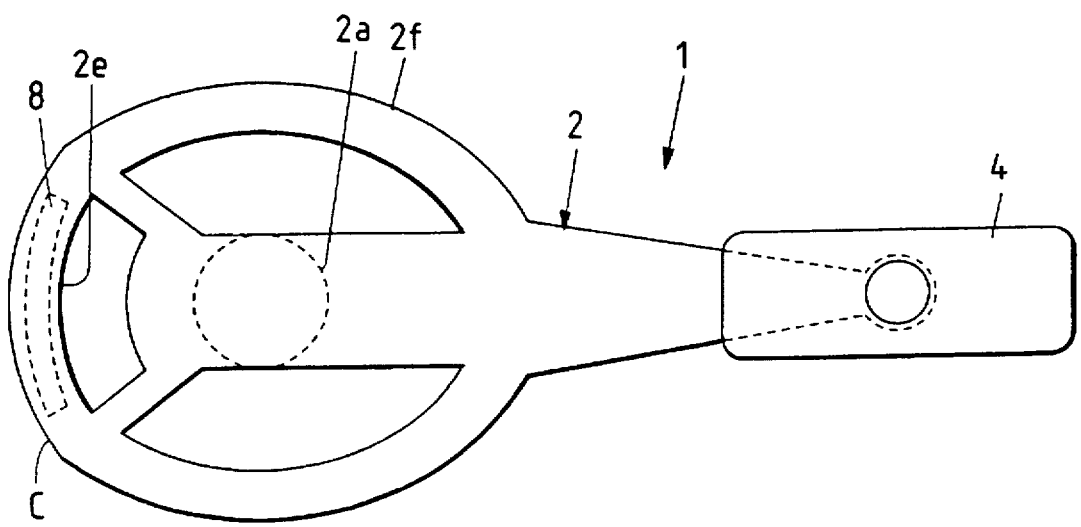
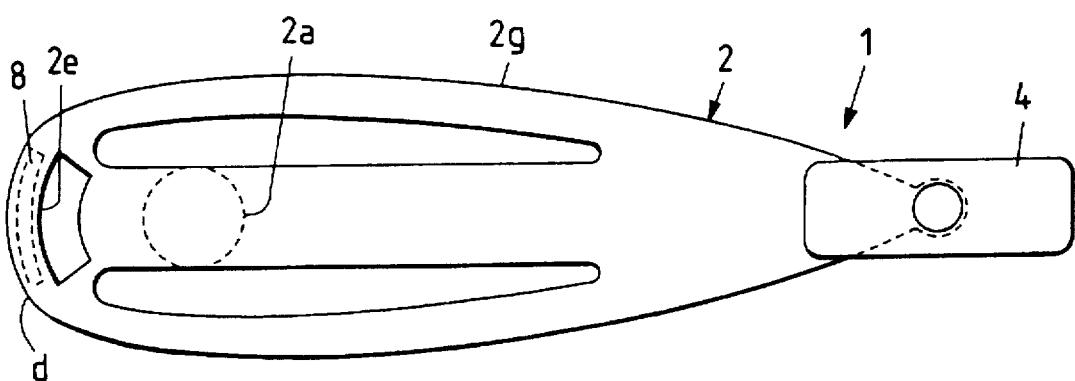
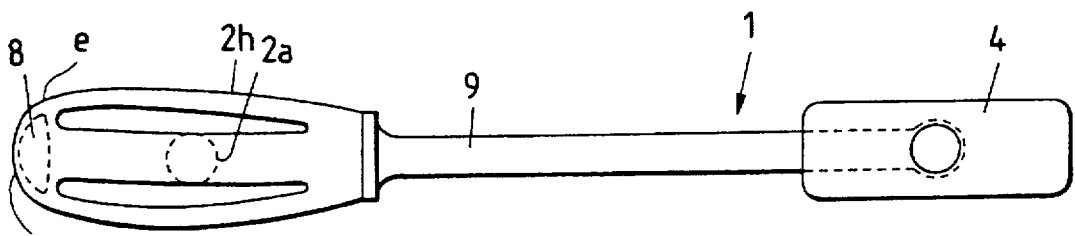
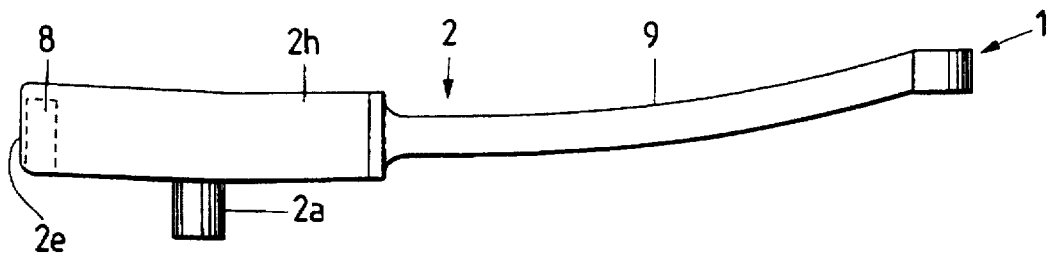

HANDLE FOR FISHING REEL

BACKGROUND OF THE INVENTION

The present invention relates to a handle for a fishing reel, which is used to take-up a fishline onto a spool.

As disclosed in the Japanese Utility Model Unexamined Publication Nos. Sho. 56-68473 and Sho. 62-119772, a handle for a fishing reel has a knob at one end for the winding-up operation and a balancer or the same knob at the other end for the counter-balancing purpose to improve the winding-up operation.

However, a fishline to be wound on the spool is likely to twist because of the repetition of winding and unwinding operations, and further the fishline is likely to be loosened or projected from the reel during the winding operation or awaiting the hit of the fish because the tension acting on the fishline is changed or the like. Thus, the conventional handle arrangement suffers from a problem that when the loosened or projected fishline 10 is looped due to the influence of the twist of the fishline and directed toward the handle, the fishline 10 tangles on the balancer or knob 4' located opposite from the knob 4 as shown in FIG. 11. This causes the fishline to be wound on the handle shaft portion with the winding operation, cuts off the fishline, and requires a troublesome labor to untangle the fishline.

SUMMARY OF THE INVENTION

Accordingly, it is a first object of the present invention to provide a handle for a fishing reel, which can surely prevent a fishline from tangling on a projected portion of the handle, which may function as a balancer. A second object of the present invention is to provide a handle for a fishing reel, which can ensure the rapid, smooth, and comfortable fishline winding operation.

In order to attain the above-noted and other objects, the present invention provides a handle for a fishing reel, adapted to be connected to a drive mechanism to wind a fishline onto a spool, the handle comprising: a handle arm; a connection means for connecting the handle arm to the drive mechanism, the connection means defining a first axis for rotation; a knob provided on the handle arm and adapted to be grasped by angler's fingers; a balancer provided on the handle arm, opposite from the knob with respect to the connection means; and means for preventing the fishline from tangling onto the balancer.

The present invention further provides a handle for a fishing reel, adapted to be connected to a drive mechanism to wind a fishline onto a spool, the handle comprising: a handle arm; a connection means for connecting the handle arm to the drive mechanism, the connection means including a first portion connected to the drive mechanism and defining a first axis for rotation, and a second portion extending from the first portion to the handle arm and defining a second axis substantially parallel to the first axis; and a knob adapted to be grasped by angler's fingers and provided on the handle arm opposite from the second portion, wherein the second axis is set off from the first axis in a direction opposite from the knob with respect to the first axis.

The present invention further provides a handle for a fishing reel, adapted to be connected to a drive mechanism to wind a fishline onto a spool, the handle comprising: a handle arm; a connection means for connecting the handle arm to the drive mechanism, the connection means defining a first axis for rotation; a knob provided on the handle arm and adapted to be grasped by angler's fingers; a balancer provided on the handle arm, the balancer being movable in a direction away from the knob with respect to the first axis due to an influence of centrifugal force when the hand is turned.

BRIEF DESCRIPTION OF THE DRAWINGS

In the accompanying drawings:

FIG. 1 is a plane view showing a bottom side of a spinning reel for fishing with a handle according to a first embodiment of the present invention;

FIG. 2 is an enlarged plane view showing the handle;

FIG. 3 is an enlarged sectional side view showing major parts of a handle according to a second embodiment of the present invention;

FIG. 4 is a plane view showing the handle of FIG. 3;

FIG. 6 is a plane view showing a handle according to a fourth embodiment of the present invention;

FIG. 7 is a plane view showing a handle according to a fifth embodiment of the present invention;

FIG. 8 is a plane view showing a handle according to a sixth embodiment of the present invention;

FIG. 9 is a side view showing the handle of FIG. 8;

DETAILED DESCRIPTION OF THE PREFERRED EMBODIMENTS

Figure 5:
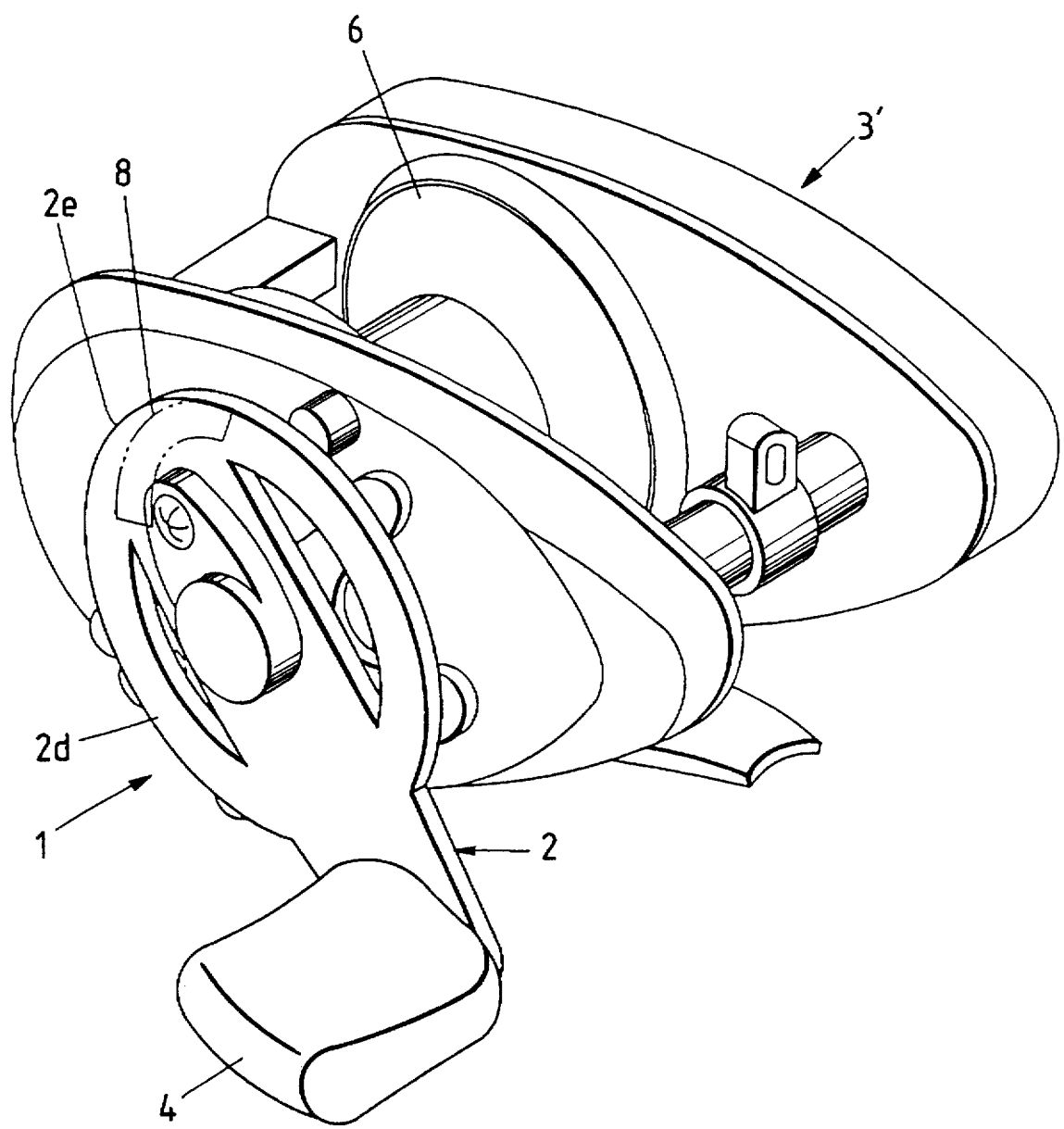
FIG. 5 is a perspective view showing a double bearing type fishing reel with a handle according to a third embodiment of the present invention.

Preferred embodiments of the present invention will now be described in detail with reference to the accompanying drawings.

FIGS. 1 and 2 shows a handle 1 according to a first embodiment of the present invention. The handle 1 includes a handle arm 2 and a boss 2a integral with the handle arm 2 and adapted to be secured to a handle shaft (not shown) of a reel 3. The handle arm 2 has an integral balancer 2b projecting radially outwardly with respect to the boss 2a. A support shaft (not shown) is projectingly provided on an end of the handle arm 2 opposite from the balancer 2b so as to rotatably support a knob 4 therearound. A portion 2c of the handle arm 2, located in the vicinity of or around the boss 2a, and the balancer 2b define a smooth outer surface a so that a fishline is prevented from tangling thereon. That is, the portion 2c and the balancer 2b form a substantially conical configuration in which the cross-sectional area is gradually decreased toward an end of the handle arm 2, opposite from the knob 4, so as to define the outer smooth surface. As well-known, a fishline take-up drive mechanism and a rotor 5 are connected to the not-shown handle shaft. A spool 6 is located in a space defined by the rotor 5 and is mounted on a spool shaft (not-shown) reciprocatingly movable back and forth.

When the handle 1 is turned with the knob 4 grasped by angler's fingers for wind-up operation, the rotor 5 is rotated through the handle shaft and the take-up drive mechanism so as to wind the fishline onto the spool 6. During this tuning of the handle 1, the projected balancer 2b integrally provided on the handle arm 2 enhances the rotative balance of the handle 1 to enable the smooth handle rotation.

In the spinning reel, the fishline is likely to twist because of the repetition of winding and unwinding the fishline onto or from the spool 6. On the other hand, the fishline is likely to be loosened or projected from the reel during the winding operation or awaiting the hit of the fish because the tension acting on the fishline is changed. Under these circumstances, the loosened or projected fishline is likely to be looped due to the influence of the twist of the fishline, and the looped fishline is likely to be directed toward the handle 1. However, in the present invention since the outer periphery 2c around or in the vicinity of the boss 2a, and outer surface of the balancer 2b are formed as a smooth surface a which prevents the fishline from tangling thereon, the looped fishline is surely prevented from tangling on the handle 1. Thus, since the fishline is prevented from tangling on the handle 1, it is possible to perform the winding operation smoothly and rapidly.

Although the balancer is described as an integral projection formed on the handle arm 2 in the above description, the balancer may be a separate member which is made of material, such as lead, having the specific gravity greater than the material of the handle arm and accommodated in a recess formed in the handle arm 2 or embedded in the handle arm 2.

FIGS. 3 and 4 show a handle for a spinning reel according to a second embodiment of the present invention.

In the handle 1 shown in FIGS. 3 and 4, the boss 2a is integrally formed on the handle arm 2. The boss 2a is adapted to be connected to the handle shaft 7 so as to be foldable with respect to the handle shaft 7. A circular plate portion 2d orthogonal to the boss 2a is integrally formed on a portion of the handle arm 2 in the vicinity of and around the boss 2a as shown in FIG. 4. A recess is formed in a portion of the circular plate portion 2d so as to be opened to a lower surface defined on one side of the portion 2d with respect to the boss 2a. The balancer 8 made of metal, such as lead, having the greater specific gravity, is embedded in the recess so as to counterbalance the weight-difference of the handle arm 2 with respect to the boss 2a. In addition, a support shaft 10 is projected from the other side of the handle arm 2 opposite from the balancer 8, and a knob is rotatably mounted on the support shaft 10.

In this embodiment, the circular plate portion 2d is formed in the vicinity of and around the boss 2a of the handle arm 2, a portion of the circular plate portion 2d is functions as a balancing portion 2e, and the outer circumference thereof is formed as the fishline anti-tangling smooth surface b.

FIG. 5 shows a double-bearing type fishing reel with a handle according to a third embodiment of the present invention, in which the handle 1 substantially identical to the handle 1 of the second embodiment is fixed on a handle shaft of the double-bearing type fishing reel. The balancer 8 made of metal having the greater specific gravity is embedded in the recess formed in the reverse side of the circular plate portion 2d of the handle 1 so as to act as the counter-balancer 2e.

FIG. 6 shows a handle for a fishing reel, according to a fourth embodiment, in which the circular plate portion 2d of the handle of the second embodiment is replaced with a oval plate portion 2f. The oval plate portion 2f has a recess opened at the lower surface of the oval plate portion 2f, the recess being located opposite from the handle knob 4 with respect to the boss 2a. The balancer 8 made of metal, such as lead, having the greater specific gravity is embedded in the recess to form the balancer portion 2e. The balancer portion 2e is formed as a part of the oval plate portion 2f so that its outer surface c is smooth to prevent the fishline from tangling thereon.

FIG. 7 shows a handle for a fishing reel, according to a fifth embodiment, in which the oval plate portion 2f of the fourth embodiment is further elongated in the longitudinal direction of the handle arm 2 to form an oblong or elongated oval plate portion 2g. The oblong plate portion 2g has a recess opened at the lower surface of the portion 2g, the recess being located opposite from the knob 4 with respect to boss 2a. The balancer 8 made of metal, such as lead, having greater specific gravity, is embedded in the recess so as to form a balancer portion 2e. The balancer portion 2e is form as a portion of the oblong plate portion 2e so as to form a smooth outer surface d onto which the fishline is prevented from tangling.

FIGS. 8 and 9 show a handle 1 for a fishing reel according to a sixth embodiment. The handle arm 2 of the handle 1 is made up of an oval plate portion 2h having an integral boss 2a, and a light-weight drawn arm 9 threadingly engaged with the oval plate portion 2h. The oval plate portion 2h has a recess opened at its lower surface and located opposite from the arm 9. The balancer 8 made of metal, such as lead, having the greater specific gravity is embedded in the recess so as to form a balancer portion 2e. The balancer portion 2e is formed as a part of the oval plate portion 2h so as to form a smooth outer surface e.

Figure 10:
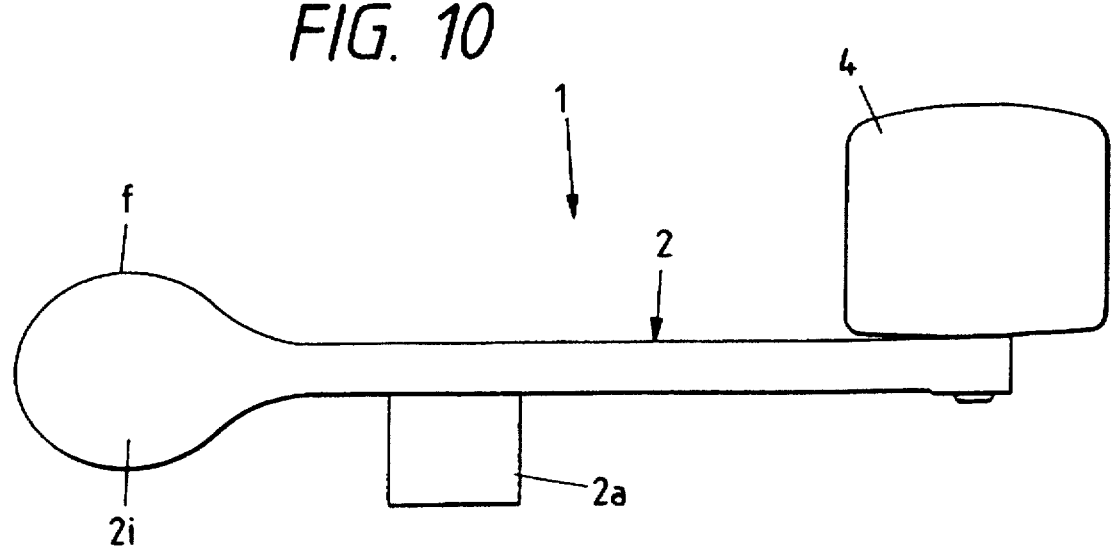
FIG. 10 is a side view showing a handle according to a seventh embodiment.
Figure 11:
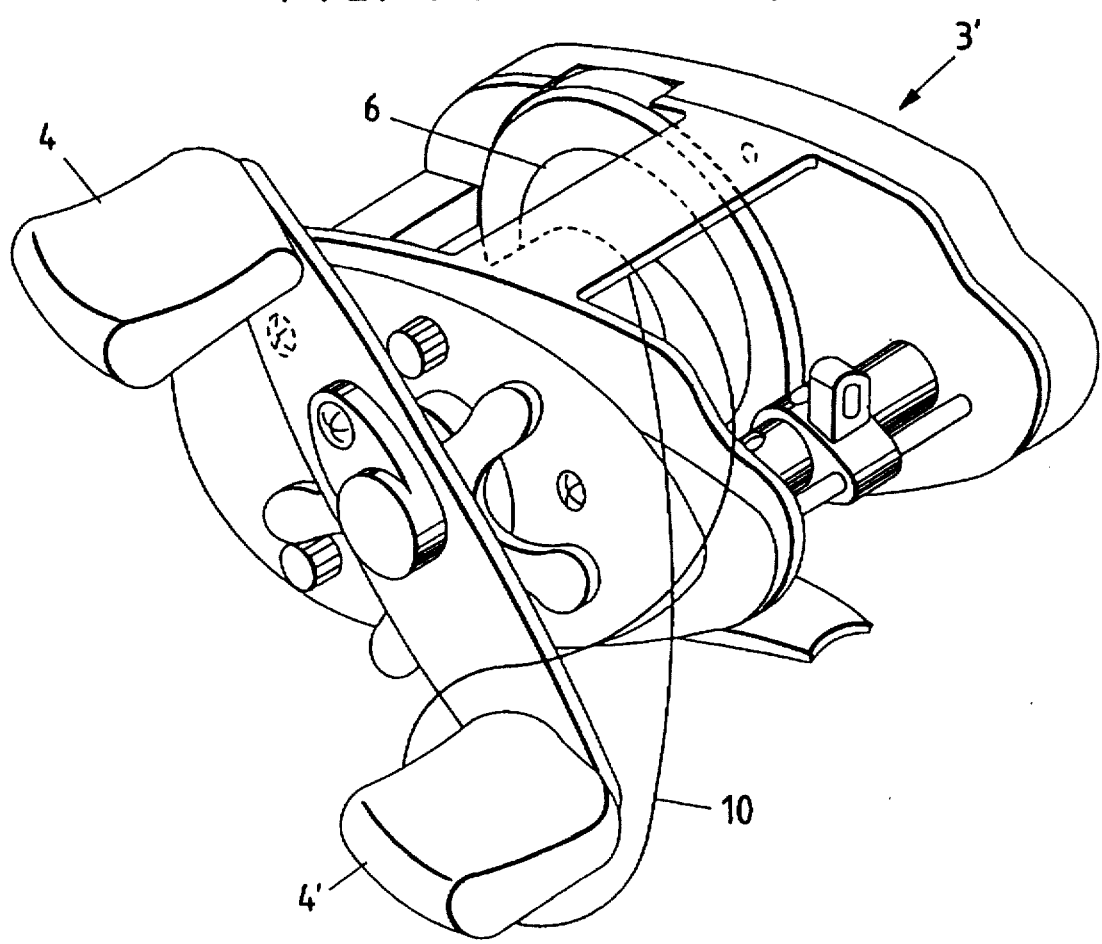
FIG. 11 is a perspective view showing a conventional fishing reel in a state that a fishline tangles on a handle knob.

FIG. 10 shows a handle 1 for a fishing reel, according to a seventh embodiment. In the handle 1 of the second embodiment, a spherical balancing portion 2i is integrally provided on a handle arm 2, the spherical balancing portion forming a smooth outer surface f so that the fishline is prevented from tangling thereon.

Generally, a fishline to be wound on the spool 6 is likely to twist because of the repetition of winding and unwinding operations, and further the fishline is likely to be loosened or projected from the reel during the winding operation or awaiting the hit of the fish because the tension acting on the fishline is changed or the like as mentioned above. However, if the handle for the fishing reel is constructed as mentioned above, even when the loosened or projected fishline is looped due to the influence of the twist of the fishline and directed toward the handle 1, the smooth outer surface a, b, c, d, e or f around the balancer 2b, 2e or 2i can surely prevent the fishline from tangling onto the handle 1. Thus, the winding operation can be performed smoothly, rapidly and surely.

In the embodiments, the boss 2a is provided on the handle arm 2 of the handle, but a mounting hole may be perforated through the handle arm 2 in place of the provision of the boss 2a so that the handle 1 is mounted on the handle shaft through the mounting hole as shown in FIG. 5.

Figure 12:
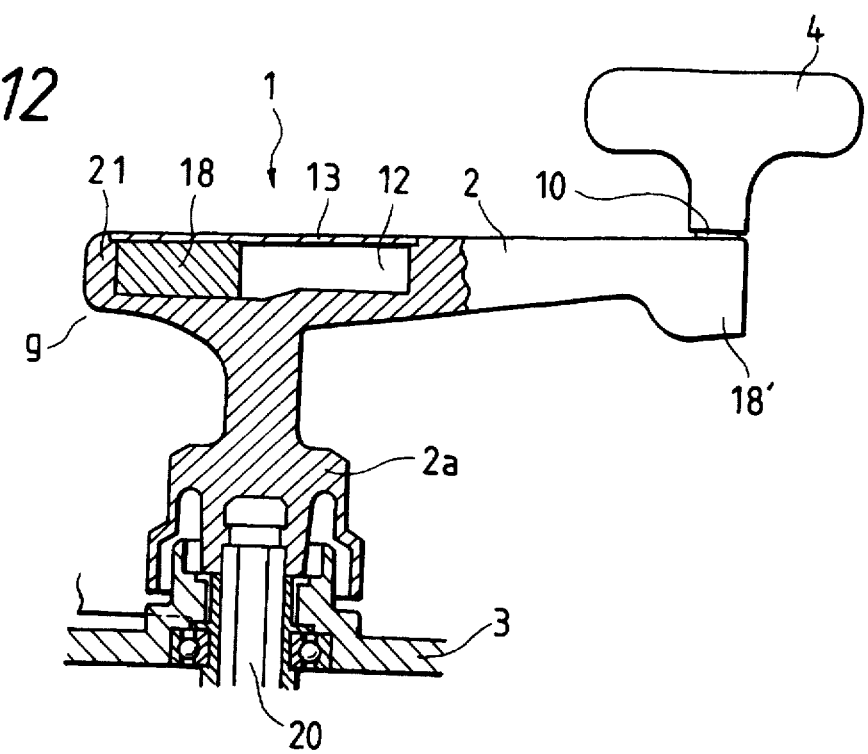
FIG. 12 is a sectional side view showing a handle according to an eighth embodiment of the present invention.

FIG. 12 shows a handle 1 for a fishing reel, according to an eighth embodiment of the present invention. The handle 1 has a relatively large capacity recess 12 opened at an upper surface of the handle arm 2. The recess 12 extends from an end of the handle arm 2, serving as a balancing portion 2j, to a substantially middle portion between the boss 2a and the other end of the handle arm 2. A balancer 18 is accommodated in the recess 12 and secured to the balancing portion 2j. A lid 13 is adhesively attached to the handle arm 2 so as to close the recess 12. The lid 13 may be removably attached to the handle arm 2. The boss 2a of the handle arm 2 is secured to a handle shaft 20 provided in the reel 3 and connected to the fishline taking-up mechanism. Another balancer 18' is integrally formed on an end of the handle arm 2 where the knob is rotatably supported through the support shaft 10. The balancing portion 2j forms a substantially conical smooth outer surface g as that of the first embodiment shown in FIGS. 1 and 2, in order to prevent the fishline from tangling thereon. The large capacity recess 12 contributes to reduce the entire weight of the handle 1 and enables to select the desired balancer 18 suitably counterbalance the weight difference of the handle arm with respect to the boss 2a. Generally, the knob 4 to be mounted on the handle arm 2 is selected depending on the price and objective of the fishing reel on which the handle 1 is to be mounted. For example, a actual wooden knob is used for the high-price reel. A plastic knob is used for reducing the production cost of the fishing reel. A metal knob can also be used. Therefore, it is preferable that the weight of the balancer 18 is changed depending on the material of the mounted knob 4 in the production line. Further, the other balancer 18' contributes to lower the center of the gravity of the knob 4 to substantially the same level as that of the balancer 18 provided in the balancing portion 2j, to thereby prevent the generation of the coupling force during the turning of the handle 1. The coupling force generally causes the handle 1 to irregularly rock about the boss 2a and gives an unpleasant feeling to the angler during the turning of the handle. Although the balancer 18' is integrally formed on the handle arm 2 in this embodiment, it may be formed as a separate member to be attached to the handle arm 2 in place.

Figure 13:
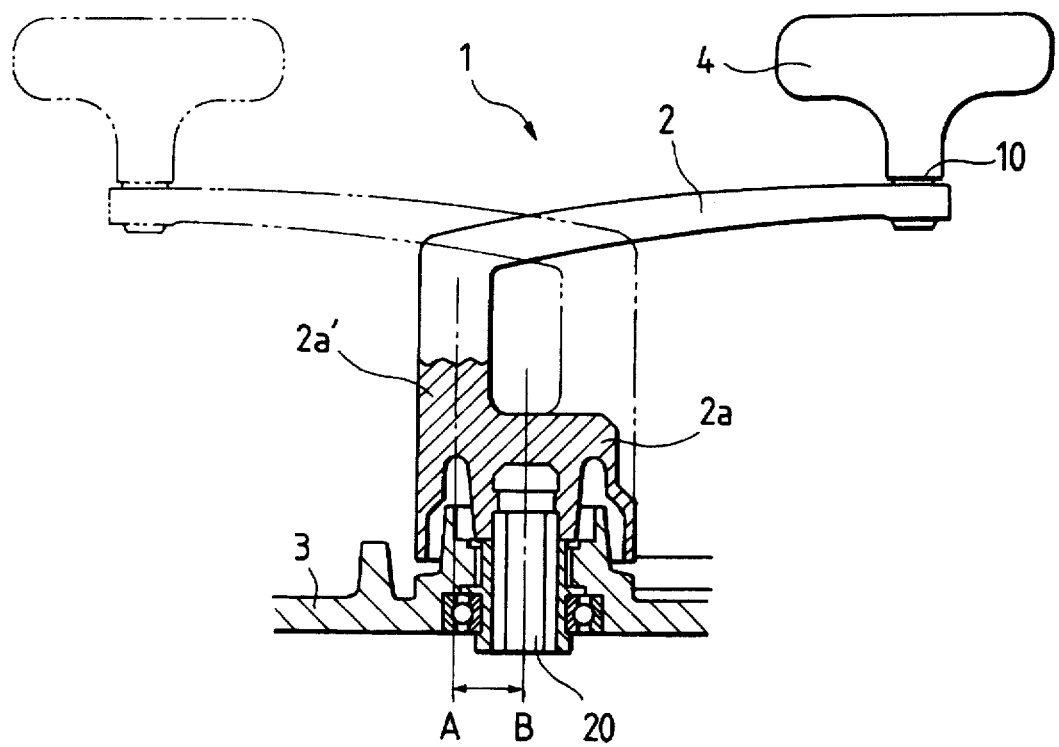
FIG. 13 is a sectional side view showing a handle according to a ninth embodiment of the present invention.

FIG. 13 shows a handle 1 for a fishing reel, according to a ninth embodiment of the present invention. The handle arm 1 of this embodiment has no projecting balancing portion, but it is modified, to improve the rotative balance, such that an axis A of a portion 2a' of the boss 2a connected to the handle arm 2 is located off-set away from a rotational axis B of the handle shaft 20. Owing to this off-set arrangement, the rotative balance of the handle 1 can be improved without any additional projecting portion. That is to say, the portion 2a' of the boss 2a functions as a balancer to counterbalance the weight difference of the handle 1 with respect to the rotational axis B during the turning of the handle 1. Since no projecting portion is provided in the vicinity of and around the boss 2a, the fishline is also prevented from tangling on the handle 1.

Figure 14:
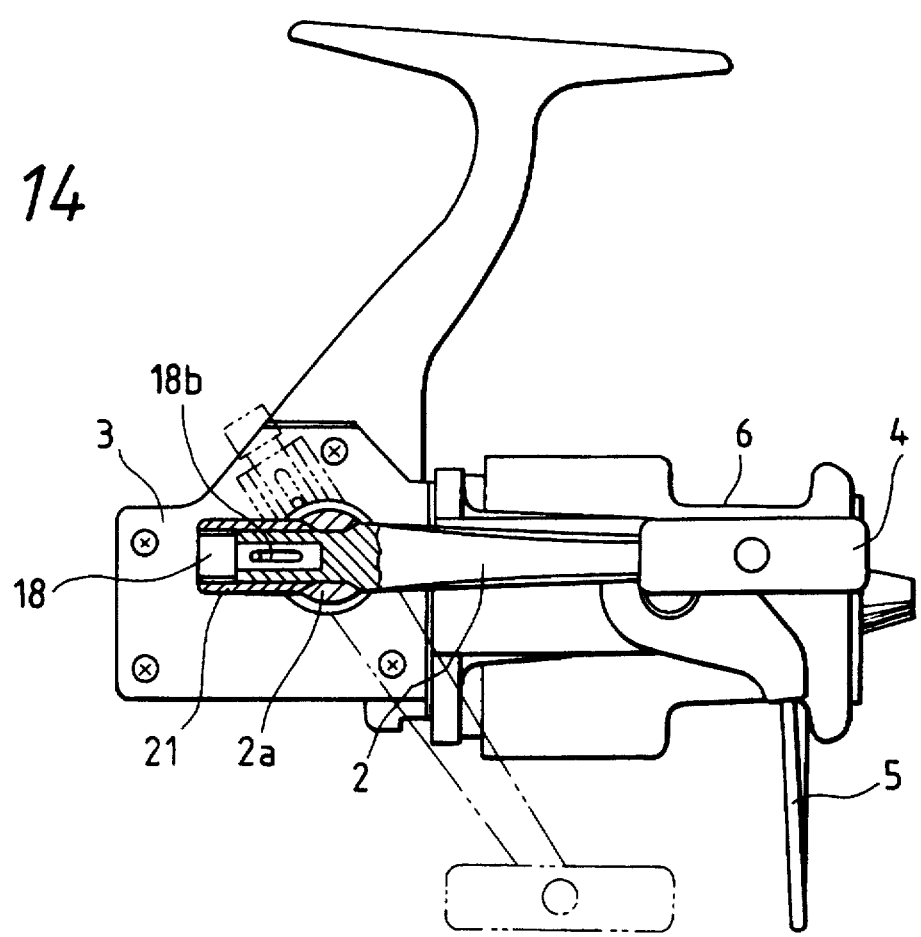
FIG. 14 is a partially cut-away side view showing a fishing reel with a handle according to a tenth embodiment of the present invention.
Figure 15:
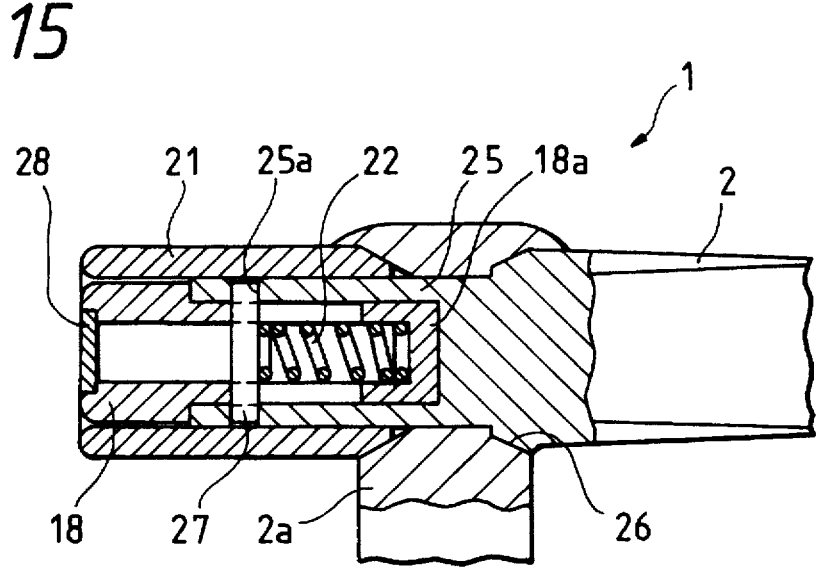
FIG. 15 is an enlarged sectional side view showing the handle of FIG. 14.
Figure 16:
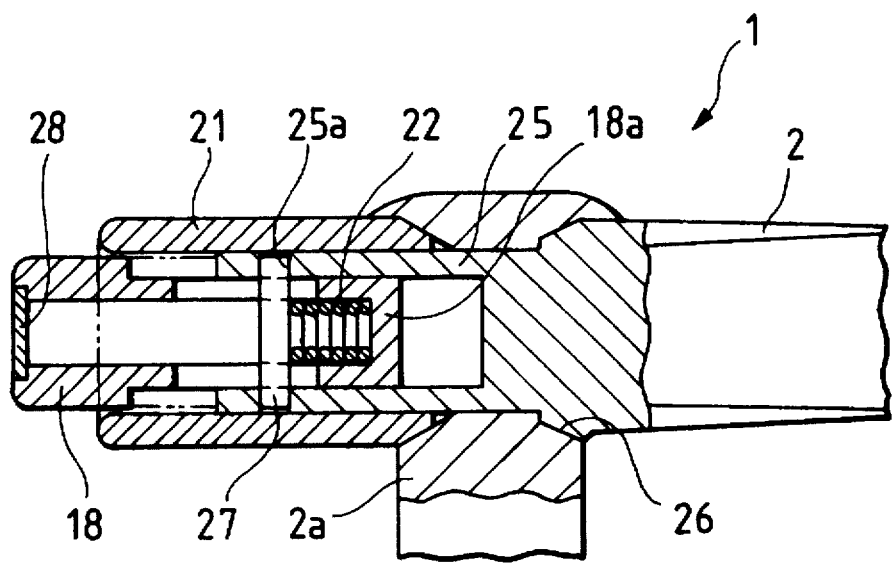
FIG. 16 is an enlarged sectional side view showing the handle of FIG. 14 in a state that a balancer 18 is projected.

FIGS. 14 to 16 show a handle for a fishing reel, according to a tenth embodiment of the present invention. In the tenth embodiment, a retractable balancer 28 is incorporated in the handle 1. The balancer 18 can project from a hollow cylinder 21 against a biasing force of a spring 22 when the handle 1 is rotated. The spring 22 is inserted inside the balancer 18 in such a manner as to be interposed between a bottom wall 18a of the balancer 18 and a pin 27 which passes through holes 25a and guide grooves 18b, to bias the balancer 18 rightward in FIG. 15. The holes 25a are formed through a hollow end portion 25 of the handle arm 2, whereas the guide grooves 18b is formed through the balancer 18. The other end of the column-like balancer 18 is chamfered to provide a smooth outer surface. The handle 1 of the tenth embodiment is assembled as follows: First, the hollow end portion 25 of the handle arm 2 is inserted into a through-hole 26 of the boss 2a. The balancer 18, into which the compressive spring 22 is inserted, is inserted inside the hollow end portion 25 of the handle arm 2. The pin 27 is inserted through the holes 25a and the guide groove 18b so that the spring 22 is interposed between the pin 27 and the bottom wall 18a of the balancer 18. The hollow cylinder 21 is threadingly engaged with an outer periphery of the hollow end portion 25 to securely fix the handle arm 2 onto the boss 2a and prevent the removal of the pin 27. In addition, a lid 28 is attached onto the end of the balancer 18.

In the handle 1 thus constructed, the balancer 18 and the hollow cylinder functions as a balancing means for counterbalancing the weight difference of the handle arm 2 with respect to the boss 2a. The hollow cylinder 21 and the balancer 18 presents a column-like smooth outer surface to prevent the fishline from tangling thereon. Further, when the handle 1 is rotated, the balancer 18 is protruded from the hollow cylinder 21 against the biasing force of the spring 22 due to the influence of the centrifugal force as shown in FIG. 16, so as to improve further the rotative balance of the handle 1 and increase the inertia force. Thus, the angler can operate the handle 1 smoothly and comfortably.

Figure 17:
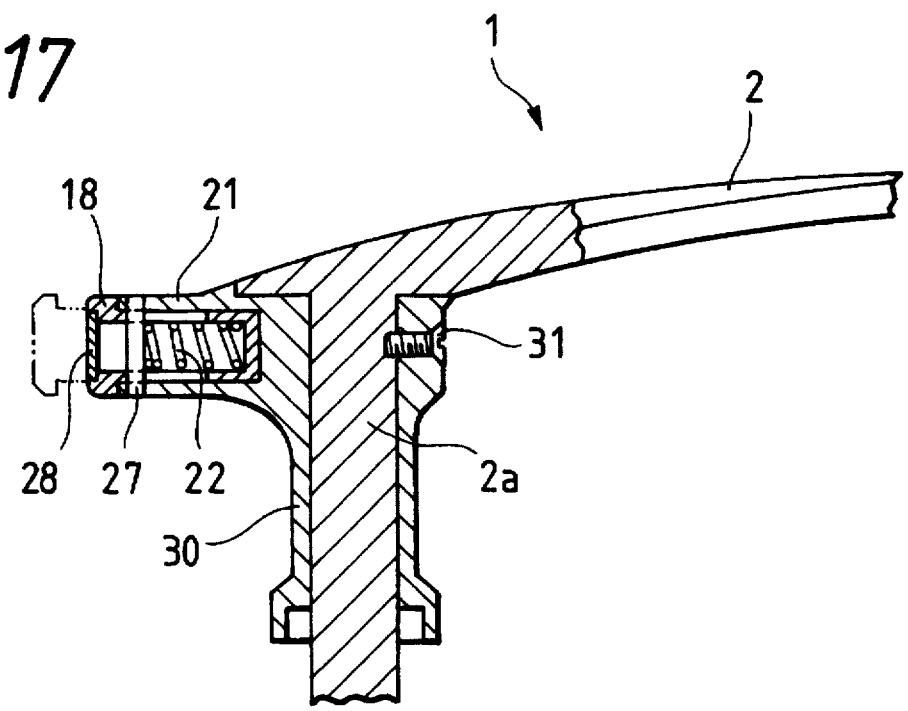
FIG. 17 is an enlarged sectional side view showing a handle where one example of modification for the tenth embodiment is applied.

Although the handle arm 2 and the boss 2a are formed as separate members connected to each other in the tenth embodiment, it is possible that the handle arm 2 and the boss 2a are formed as an integral one-piece member and the balancer part 30 including the balancer 18, the spring 22 and the hollow cylinder 21 is mounted and fixed onto the boss 2a with a screw 31, as shown in FIG. 17.

According to the present invention, it is possible to provide a handle for a fishing reel, with which an angler can perform the fishline winding-up operation rapidly, comfortably and smoothly without any concerns about the tangle of the fishline onto the handle.

What is claimed is:

1. A handle for a fishing reel, adapted to be connected to a drive mechanism to wind a fishline onto a spool, said handle comprising:

a handle arm;

a connection means for connecting said handle arm to said drive mechanism, said connection means defining a first axis for rotation;

a knob provided on said handle arm and adapted to be grasped by angler's fingers;

a balancer provided on said handle arm, opposite from said knob with respect to said connection means; and means for preventing said fishline from tangling onto said balancer;

wherein said balancer is formed with a portion of said hand arm into a substantially conical projection and together extend substantially in a direction perpendicular to said first axis, so as to prevent said fishline from tangling thereon, and wherein said balancer together with said portion of said handle arm merging into said projection defines a smooth conical outer surface.

2. The handle according to claim 1, wherein said projection merges into said handle arm substantially flush therewith.

* * * * *